United States Patent
Anglin et al.

(10) Patent No.: US 10,197,150 B2
(45) Date of Patent: Feb. 5, 2019

(54) GEAR BAFFLE CONFIGURED WITH LUBRICANT OUTLET PASSAGE

(71) Applicant: United Technologies Corporation, Hartford, CT (US)

(72) Inventors: Christopher T. Anglin, Manchester, CT (US); Lawrence A. McLean, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 306 days.

(21) Appl. No.: 14/949,120

(22) Filed: Nov. 23, 2015

(65) Prior Publication Data

US 2017/0146112 A1    May 25, 2017

(51) Int. Cl.
*F16H 57/04*     (2010.01)
*F02C 7/32*     (2006.01)

(52) U.S. Cl.
CPC .......... *F16H 57/0421* (2013.01); *F02C 7/32* (2013.01); *F16H 57/0423* (2013.01); *F16H 57/0495* (2013.01); *F05D 2260/4031* (2013.01); *F05D 2260/532* (2013.01); *F05D 2260/98* (2013.01)

(58) Field of Classification Search
CPC .... F16H 57/0421; F16H 57/0495; F02C 7/32; F05D 2260/4031; F02D 2260/98
See application file for complete search history.

(56) References Cited

U.S. PATENT DOCUMENTS

| | | | |
|---|---|---|---|
| 1,686,271 A * | 10/1928 | George | B61F 17/20 184/11.1 |
| 3,942,387 A | 3/1976 | Stone et al. | |
| 4,667,774 A | 5/1987 | Roberge | |
| 7,341,426 B2 | 3/2008 | Schwarz et al. | |
| 7,386,983 B2 | 6/2008 | Miller | |
| 7,500,365 B2 | 3/2009 | Suciu et al. | |
| 8,011,883 B2 | 9/2011 | Schwarz et al. | |
| 8,333,678 B2 | 12/2012 | McCune | |
| 8,585,538 B2 | 11/2013 | Sheridan et al. | |
| 8,919,134 B2 | 12/2014 | Tatman et al. | |
| 8,973,465 B2 | 3/2015 | Duong | |
| 9,068,515 B2 | 6/2015 | Duong et al. | |
| 9,074,681 B2 | 7/2015 | Hanlon et al. | |
| 9,115,650 B2 | 8/2015 | McCune et al. | |
| 2008/0073152 A1* | 3/2008 | Eleftheriou | F01D 25/18 184/6.12 |
| 2015/0097073 A1 | 4/2015 | McPeak et al. | |

FOREIGN PATENT DOCUMENTS

DE    102008011937 A1    9/2009
GB        2223819 A       4/1990

OTHER PUBLICATIONS

EP search report for EP16199972.7 dated Jun. 29, 2017.

\* cited by examiner

*Primary Examiner* — Jake Cook
(74) *Attorney, Agent, or Firm* — O'Shea Getz P.C.

(57) ABSTRACT

A transmission system may include a first bevel gear, a second bevel gear and a baffle. The second bevel gear is meshed with the first bevel gear, and includes a plurality of gear teeth arranged in a circumferential array. The baffle includes a baffle wall and a baffle outlet. The baffle wall is arranged next to and covers a subset of the gear teeth. The baffle outlet forms a lubricant outlet passage that extends through the baffle wall.

18 Claims, 9 Drawing Sheets

GEAR BAFFLE CONFIGURED WITH LUBRICANT OUTLET PASSAGE

BACKGROUND OF THE INVENTION

1. Technical Field

This disclosure relates generally to a transmission system and, more particularly, to a baffle for a set of meshing gears such as, for example, meshing bevel gears in a turbine engine.

2. Background Information

A turbine engine may include a transmission system for coupling one of its spools to an accessory gearbox. This transmission system may include a bull gear mounted to a shaft of the spool. The transmission system also includes a tower shaft and an associated bevel gear mounted to a first end of the tower shaft, where a second end of the tower shaft is coupled to the accessory gearbox. The transmission system may also include a baffle configured to cover at least a portion of the bevel gear (or the bull gear). Such a baffle is provided so as to prevent surplus lubricant, churning within a compartment in which the transmission system is located, from impinging on that portion of the bevel gear (or the bull gear) since such surplus lubricant impingement may increase windage (e.g., fluid drag) on the bevel gear (or the bull gear). However, such a baffle may also capture lubricant which is propelled off of the bevel gear. This captured lubricant may churn within the space between the bevel gear and the baffle and thereby cause windage on the bevel gear.

There is a need in the art for an improved baffle which can further reduce lubricant related windage on a gear such as a bevel gear.

SUMMARY OF THE DISCLOSURE

According to an aspect of the present disclosure, a transmission system is provided that includes a first bevel gear, a second bevel gear and a baffle. The second bevel gear is meshed with the first bevel gear. The second bevel gear includes a plurality of gear teeth arranged in a circumferential array. The baffle includes a baffle wall and a baffle outlet. The baffle wall is arranged next to and covers a subset of the gear teeth. The baffle outlet forms a lubricant outlet passage that extends through the baffle wall.

According to another aspect of the present disclosure, a transmission system is provided within a compartment. The transmission system includes a first bevel gear, a second bevel gear and a baffle. The second bevel gear includes a plurality of gear teeth arranged in a circumferential array. A first subset of the gear teeth within a first region are meshed with the first bevel gear. A second subset of the gear teeth within a second region are disengaged from the first bevel gear. The baffle includes a baffle wall and a baffle outlet. The baffle wall is configured to substantially prevent the second subset of the gear teeth in the second region from receiving lubricant particles moving within the compartment. The baffle outlet forms a lubricant outlet passage that extends through the baffle wall. The lubricant outlet passage is configured to receive lubricant propelled off of the second bevel gear.

According to another aspect of the present disclosure, a turbine engine is provided that includes a turbine engine spool, a tower shaft, a bearing compartment and a transmission system. The transmission system is located within the bearing compartment. The transmission system includes a pair of bevel gears and a baffle. A first of the bevel gears is connected to the turbine engine spool. A second of the bevel gears is connected to the tower shaft. One of the bevel gears (e.g., the first or second bevel gear) includes a plurality of gear teeth arranged in a circumferential array. A first subset of the gear teeth within a first region are meshed with another one of the bevel gears (e.g., the second or first bevel gear). A second subset of the gear teeth within a second region are disengaged from the other one of the bevel gears. The baffle includes a baffle wall and a baffle outlet. The baffle wall covers the second subset of the gear teeth in the second region. The baffle outlet forms a lubricant outlet passage that extends through the baffle wall.

The baffle wall may cover the second subset of the gear teeth in the second region.

The baffle outlet may include an orifice and an orifice cover. The orifice may extend through the baffle wall and/or may form a first portion of the lubricant outlet passage. The orifice cover may overlap the orifice. The orifice cover may be connected to the baffle wall. The orifice cover may form a second portion of the lubricant outlet passage with the baffle wall.

The subset of the gear teeth may be disengaged from the first bevel gear. Another subset of the gear teeth may be meshed with the first bevel gear.

The baffle outlet may be located proximate the other subset of the gear teeth.

The subset of the gear teeth may define a radial outer peripheral region of the second bevel gear which extends circumferentially around a rotational axis of the second bevel gear more than about 4.7 radians.

The subset of the gear teeth may define a radial outer peripheral region of the second bevel gear which extends circumferentially around a rotational axis of the second bevel gear between about 3.3 radians and about 5.3 radians.

The baffle wall may be configured to substantially prevent the subset of the gear teeth from receiving lubricant.

The baffle wall may form a baffle channel. The subset of the gear teeth may extend into the baffle channel.

The baffle channel may extend circumferentially around a rotational axis of the second bevel gear between a first channel end and a second channel end. The first channel end may be disposed forward of the second channel end relative to rotation of the second bevel gear about the rotational axis. The baffle outlet may be arranged at the first channel end.

The baffle outlet may include an orifice and an orifice cover. The orifice may extend through the baffle wall, and may form a first portion of the lubricant outlet passage. The orifice cover may overlap the orifice. The orifice cover may be connected to the baffle wall. The orifice cover may form a second portion of the lubricant outlet passage with the baffle wall.

The orifice cover may project circumferentially beyond the orifice.

The orifice may have a polygonal cross-sectional geometry.

The orifice may have a first circumferential width at a first location and a second circumferential width at a second location. The first circumferential width may be less than or greater than the second circumferential width. The first location may be radially closer to a rotational axis of the second bevel gear than the second location.

The baffle outlet may be formed by a double walled portion of the baffle.

The baffle may include a window. A portion of the second bevel gear may extend radially out through the window. The portion of the second bevel gear may mesh with the first bevel gear. Alternatively, a portion of the first bevel gear may extend radially out through the window. The portion of the first bevel gear may mesh with the second bevel gear.

The baffle may include a second baffle outlet which forms a second lubricant outlet passage that extends through the baffle wall.

A turbine engine spool and a tower shaft may be included. The first bevel gear may be connected to the turbine engine spool. The second bevel gear may be connected to the tower shaft.

The foregoing features and the operation of the invention will become more apparent in light of the following description and the accompanying drawings.

DETAILED DESCRIPTION OF THE INVENTION

Figure 1:
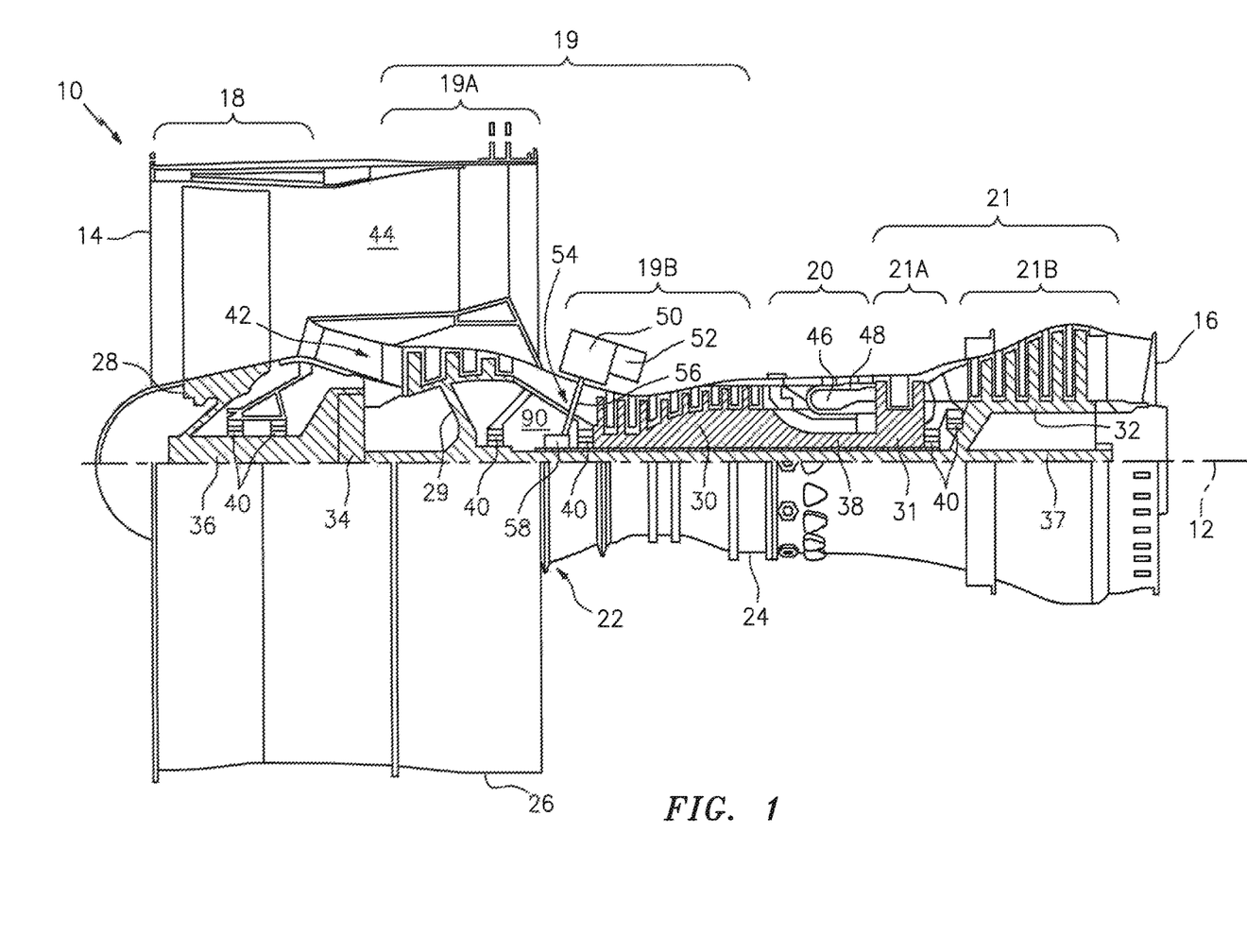
FIG. 1 is a side cutaway illustration of a geared turbine engine.

FIG. 1 is a side cutaway illustration of a geared turbine engine 10, which is configured as a turbofan engine for an aircraft propulsion system. This turbine engine 10 extends along an axial centerline 12 between an upstream airflow inlet 14 and a downstream airflow exhaust 16.

The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. This housing 22 includes an inner case 24 (e.g., a core case) and an outer case 26 (e.g., a fan case). The inner case 24 may house one or more of the engine sections 19-21; e.g., an engine core. The outer case 26 may house at least the fan section 18.

Each of the engine sections 18, 19A, 19B, 21A and 21B includes a respective rotor 28-32. Each of these rotors 28-32 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 28 is connected to a gear train 34, for example, through a fan shaft 36. The gear train 34 and the LPC rotor 29 are connected to and driven by the LPT rotor 32 through a low speed shaft 37. The combination of at least the LPC rotor 29, the LPT rotor 32 and low speed shaft 37 may be referred to as "a low speed spool". The HPC rotor 30 is connected to and driven by the HPT rotor 31 through a high speed shaft 38. The combination of at least the HPC rotor 30, the HPT rotor 31 and high speed shaft 38 may be referred to as "a high speed spool". The shafts 36-38 are rotatably supported by a plurality of bearings 40; e.g., rolling element and/or thrust bearings. Each of these bearings 40 is connected to the engine housing 22 by at least one stationary structure such as, for example, an annular support strut.

During operation, air enters the turbine engine 10 through the airflow inlet 14. This air is directed through the fan section 18 and into a core gas path 42 and a bypass gas path 44. The core gas path 42 flows sequentially through the engine sections 19-21. The air within the core gas path 42 may be referred to as "core air". The bypass gas path 44 flows through a duct between the inner case 24 and the outer case 26. The air within the bypass gas path 44 may be referred to as "bypass air".

The core air is compressed by the compressor rotors 29 and 30 and directed into a combustion chamber 46 of a combustor 48 in the combustor section 20. Fuel is injected into the combustion chamber 46 and mixed with the compressed core air to provide a fuel-air mixture. This fuel air mixture is ignited and combustion products thereof expand and flow through and sequentially cause the turbine rotors 31 and 32 to rotate. The rotation of the turbine rotors 31 and 32 respectively drive rotation of the compressor rotors 30 and 29 and, thus, compression of the air received from the core airflow inlet 14. The rotation of the turbine rotor 32 also drives rotation of the fan rotor 28, which propels bypass air through and out of the bypass gas path 44. The propulsion of the bypass air may account for a majority of thrust generated by the turbine engine 10, e.g., more than seventy-five percent (75%) of engine thrust. The turbine engine 10 of the present disclosure, however, is not limited to the foregoing exemplary thrust ratio.

The turbine engine 10 of FIG. 1 also includes an accessory gearbox 50, one or more gearbox attachments 52 and a transmission system 54. The accessory gearbox 50 is mounted to the inner case 24. However, in alternative embodiments, the accessory gearbox 50 may be mounted elsewhere with the turbine engine 10; e.g., to the outer case 26. The accessory gearbox 50 is configured to transfer rotational energy (e.g., torque) between the transmission system 54 and the one or more gearbox attachments 52. An example of an accessory gearbox is disclosed in U.S. Pat. No. 9,068,515 to Duong et al., which is assigned to the assignee of the present disclosure. Examples of a gearbox attachment may include an air turbine starter, a deoiler, a hydraulic pump, an oil pump, an integrated drive generator, a permanent magnet alternator and a fuel pump module. Of course, the present disclosure is not limited to including the foregoing exemplary types or configurations of the accessory gearbox 50 or the gearbox attachments 52.

Figure 2:
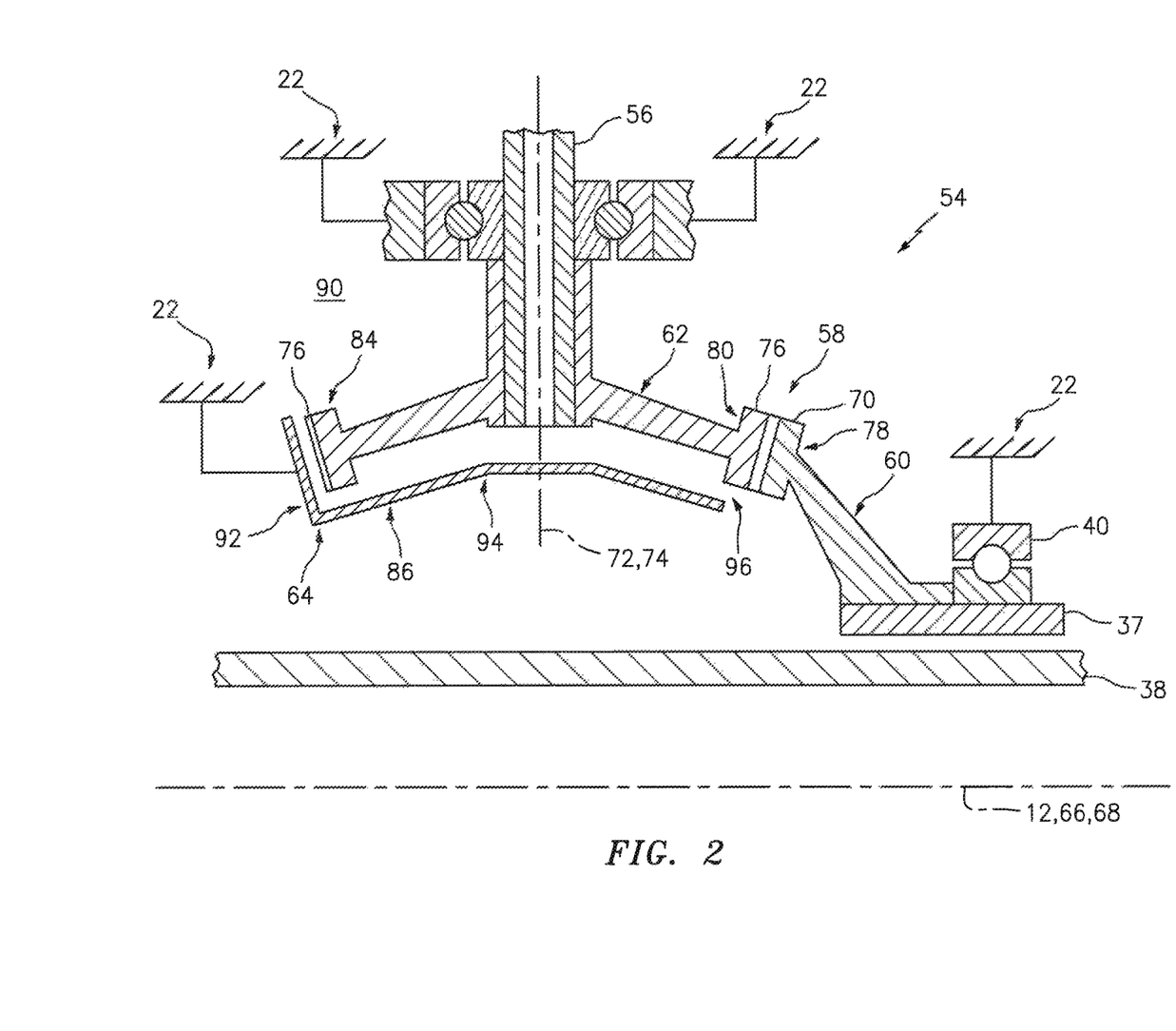
FIG. 2 is a side sectional schematic diagram of a transmission system.

The transmission system 54 is configured to mechanically couple and thereby transfer rotational energy (e.g., torque) between a rotating assembly (or component) of the turbine engine 10 and the accessory gearbox 50. In particular, the transmission system 54 of FIG. 1 mechanically couples one of the spools of the turbine engine 10 (e.g., via the high speed spool) with the accessory gearbox 50. This transmission system 54 includes the high speed shaft 38, a tower shaft 56 and a geared system 58. Referring to FIG. 2, the geared system 58 includes a first gear 60, a second gear 62 and a baffle 64.

The first gear 60 of FIG. 2 is configured as a bevel gear and, in particular, as a bull bevel gear. This first gear 60 is mounted to the high speed shaft 38, for example, by a splined interface (e.g., see FIG. 3). The first gear 60 has a first rotational axis 66, which is coaxial with a rotational axis 68 of the low speed shaft 37; e.g., the centerline 12.

Figure 3:
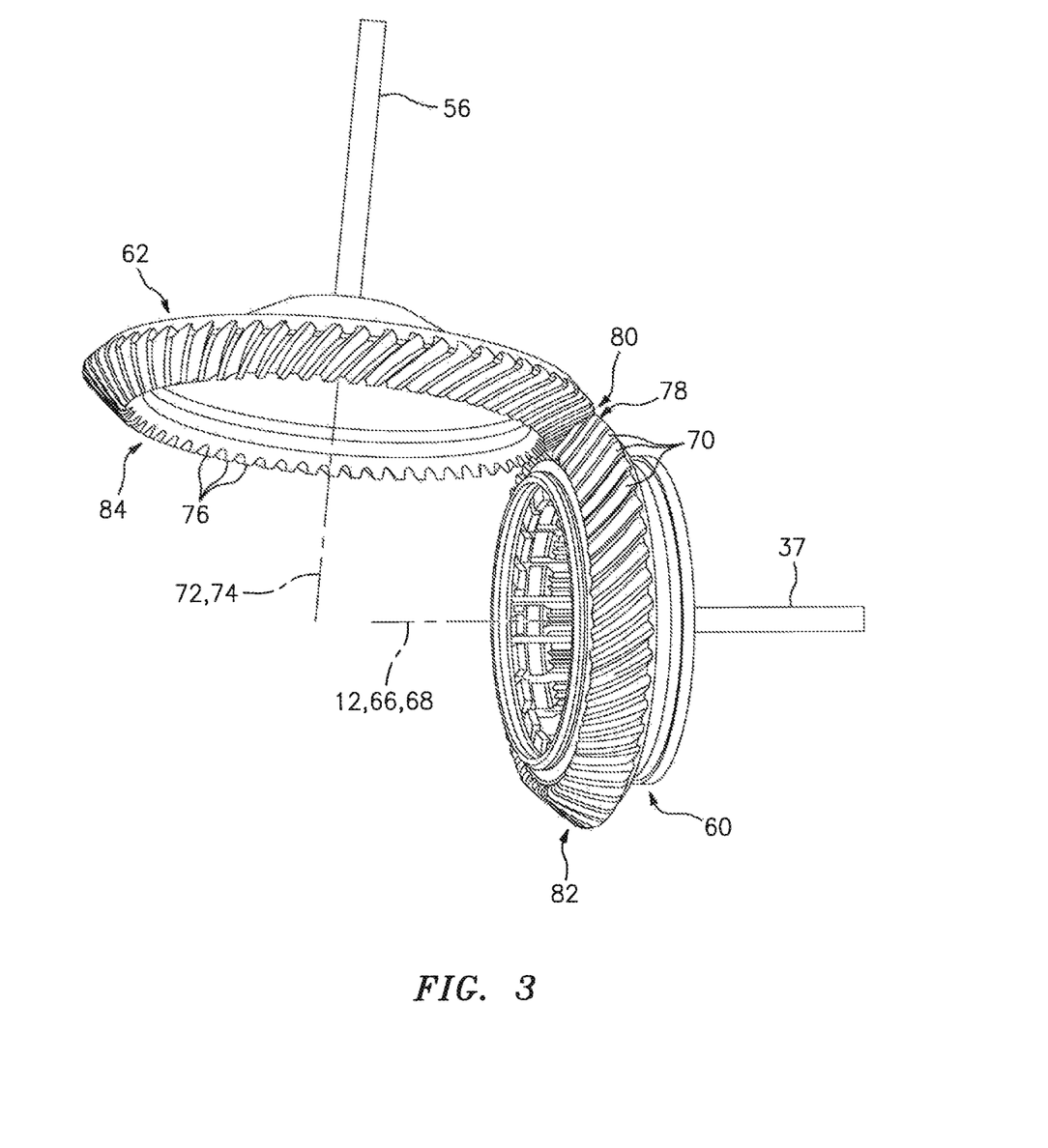
FIG. 3 is a perspective illustration of meshing gears and associated shafts for the transmission system.

Referring to FIG. 3, the first gear 60 includes a plurality of first gear teeth 70. These first gear teeth 70 are arranged in a circumferential array, which extends circumferentially around the first rotational axis 66. The first gear teeth 70 of FIG. 3 are configured to provide the first gear 60 with an annular, conically shaped pitch surface. Herein, the term "pitch surface" may describe an imaginary toothless surface formed by averaging out peaks and valleys of the first gear teeth 70. The first gear teeth 70 of FIG. 3 are further configured to provide the first gear 60 with a spiral (or helical) bevel gear configuration. However, in other embodiments, the first gear teeth 70 may be configured to provide the first gear 60 with a straight bevel gear configuration, a Zerol bevel gear configuration, a hypoid bevel gear configuration or a double spiral (or helical) bevel gear configuration. The present disclosure, of course, is not limited to the foregoing exemplary first gear types or configurations.

The second gear 62 of FIG. 2 is also configured as a bevel gear. This second gear 62 is mounted to the tower shaft 56, for example, by a splined interface. The second gear 62 has a second rotational axis 72, which is coaxial with a rotational axis 74 of the tower shaft 56. This second rotational axis 72 is arranged coincident with and at least generally (e.g., within +/− one or two degrees) perpendicular to the first rotational axis 66. However, in other embodiments, the second rotational axis 72 may be arranged coincident with and acutely or obtusely angled to the first rotational axis 66.

Referring to FIG. 3, the second gear 62 includes a plurality of second gear teeth 76. These second gear teeth 76 are arranged in a circumferential array, which extends circumferentially around the second rotational axis 72. The second gear teeth 76 of FIG. 3 are configured to provide the second gear 62 with an annular, conically shaped pitch surface. The second gear teeth 76 of FIG. 3 are further configured to provide the second gear 62 with a spiral (or helical) bevel gear configuration. However, in other embodiments, the second gear teeth 76 may be configured to provide the second gear 62 with a straight bevel gear configuration, a Zerol bevel gear configuration, a hypoid bevel gear configuration or a double spiral (or helical) bevel gear configuration. The present disclosure, of course, is not limited to the foregoing exemplary second gear types or configurations.

Still referring to FIG. 3, the second gear 62 is meshed (e.g., mated and engaged) with the first gear 60. In particular, a first subset 78 (e.g., meshed subarray) of the first gear teeth 70 are mesh with a first subset 80 (e.g., meshed subarray) of the second gear teeth 76, where each of these subsets 78, 80 includes one or more of the respective gear teeth 70, 76. With the foregoing meshed configuration, a second subset 82 (e.g., unmeshed subarray) of the first gear teeth 70 (e.g., the remaining first gear teeth) are unmeshed and disengaged from a second subset 84 (e.g., unmeshed subarray) of the second gear teeth 76 (e.g., the remaining second gear teeth), where each of these subsets 82, 84 includes a plurality—e.g., here the majority—of the respective gear teeth 70, 76. Note, the specific gear teeth in each subset will change as the respective gear rotates about its respective rotational axis.

Figure 4:
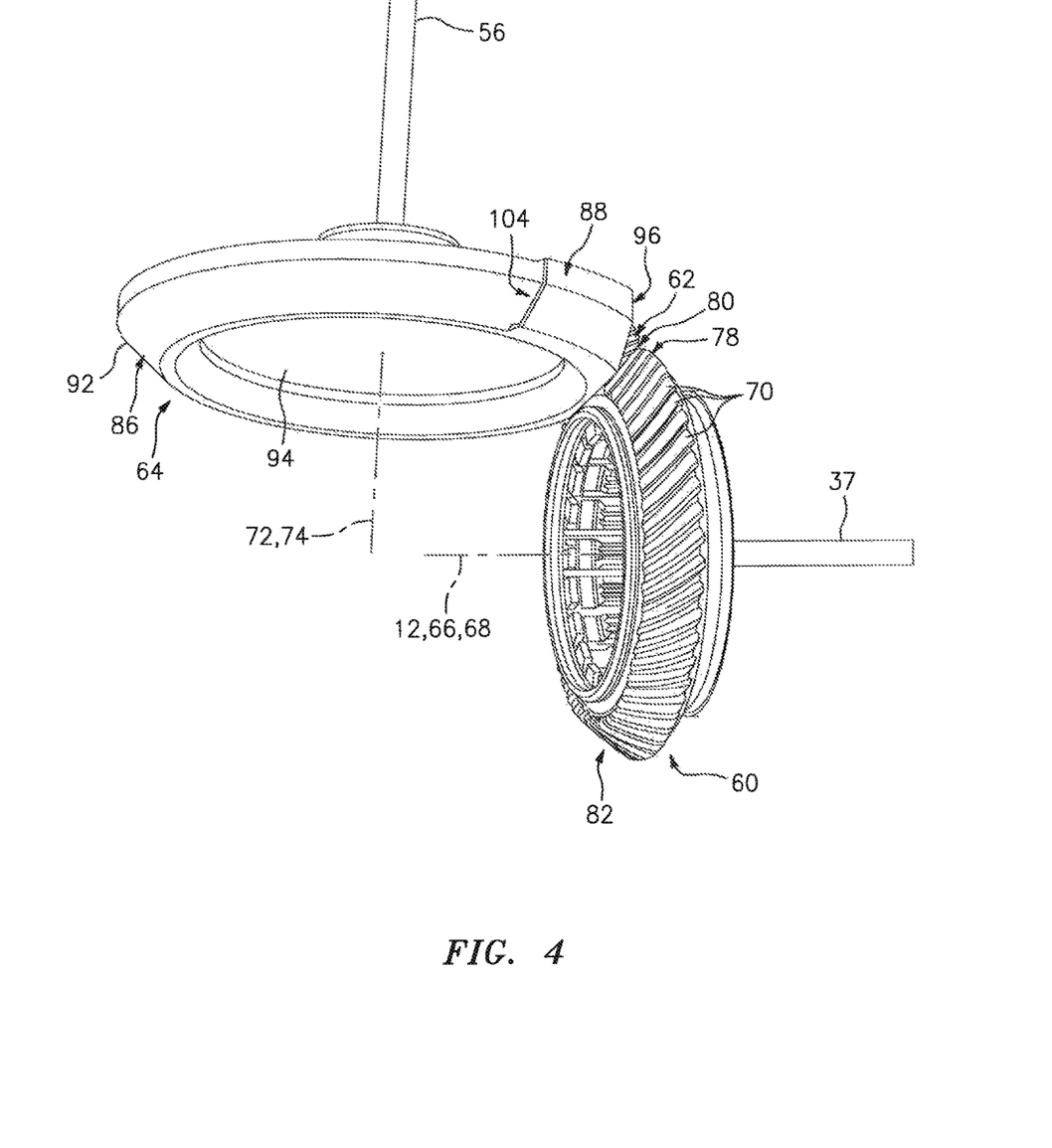
FIG. 4 is a perspective illustration of the transmission system.

Referring to FIGS. 2 and 4, the baffle 64 is arranged with (e.g., positioned next to and in close proximity with) the second gear 62 so as to cover a region of the second gear 62 as described below in further detail. The baffle 64 is connected to a stationary structure (see FIG. 2; e.g., generally the housing 22) and thereby remains stationary as the second gear 62 rotates about its rotational axis 72.

The baffle 64 includes a baffle wall 86 and a baffle outlet 88. The baffle wall 86 is configured to cover the second subset 84 of the second gear teeth 76. The baffle wall 86, however, may not cover the first subset 80 of the second gear teeth 76; i.e., leaves the first subset 80 uncovered and exposed. In this manner, the baffle wall 86 is operable to enable a lubricant system (not shown) to direct lubricant (e.g., oil) onto the first and/or the second gear teeth 70, 76 just prior to and/or at a region where those gear teeth mesh with one another (see FIG. 3). However, the baffle wall 86 may be operable to substantially prevent the unmeshed/disengaged second gear teeth 76 (e.g., the second subset 84 of the second gear teeth) from being impinged by or otherwise receiving additional lubricant; e.g., lubricant particles churning or otherwise moving around a compartment 90 (e.g., bearing compartment) in which the transmission system 54 is located; see FIG. 2. Such additional lubricant, if allowed to impinge on the unmeshed/disengaged second gear teeth 76, may increase second gear 62 windage and thereby decrease efficiency of the transmission system 54 and, thus, the turbine engine 10.

In the specific embodiment of FIG. 4, the baffle wall 86 is configured as a segmented circular body. This baffle wall 86 includes a radial outer peripheral portion 92 and a radial interior portion 94. The peripheral portion 92 may have a generally segmented annular geometry. The peripheral portion 92 extends circumferentially around the second rotational axis 72 so as to form, for example, a full hoop. The peripheral portion 92, however, is configured to also form a window 96 (see also FIGS. 6 and 7) at the segmented portion of the baffle wall 86. This window 96 is sized and shaped such that a portion (e.g., a minor segment) of the second gear 62 may extend radially through the window 96 and mesh with the first gear 60 as described above. The window 96 is also sized and shaped to enable the lubricant system to direct the lubricant onto the first and/or the second gear teeth 70, 76.

Figure 5:
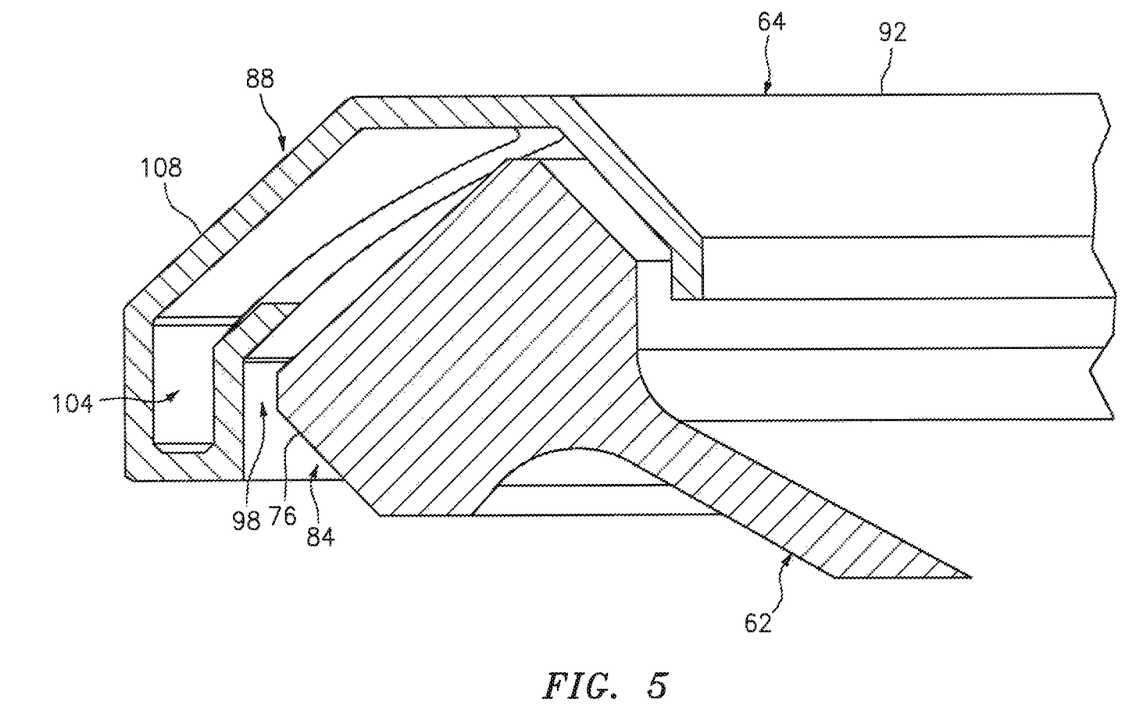
FIG. 5 is a perspective sectional illustration of a portion of a gear and a portion of an associated baffle for the transmission system.
Figure 6:
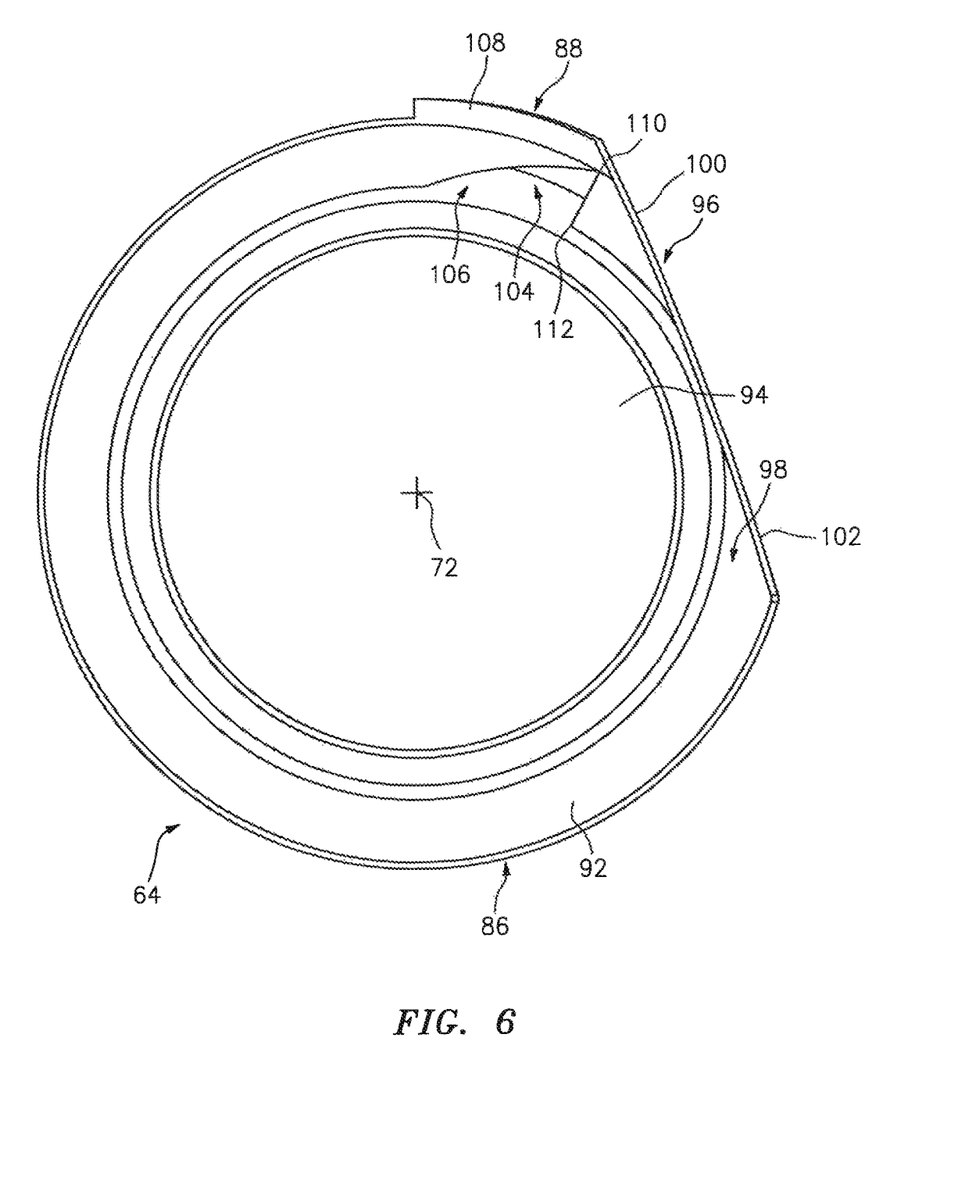
FIG. 6 is an illustration of an interior side of the baffle.
Figure 7A:
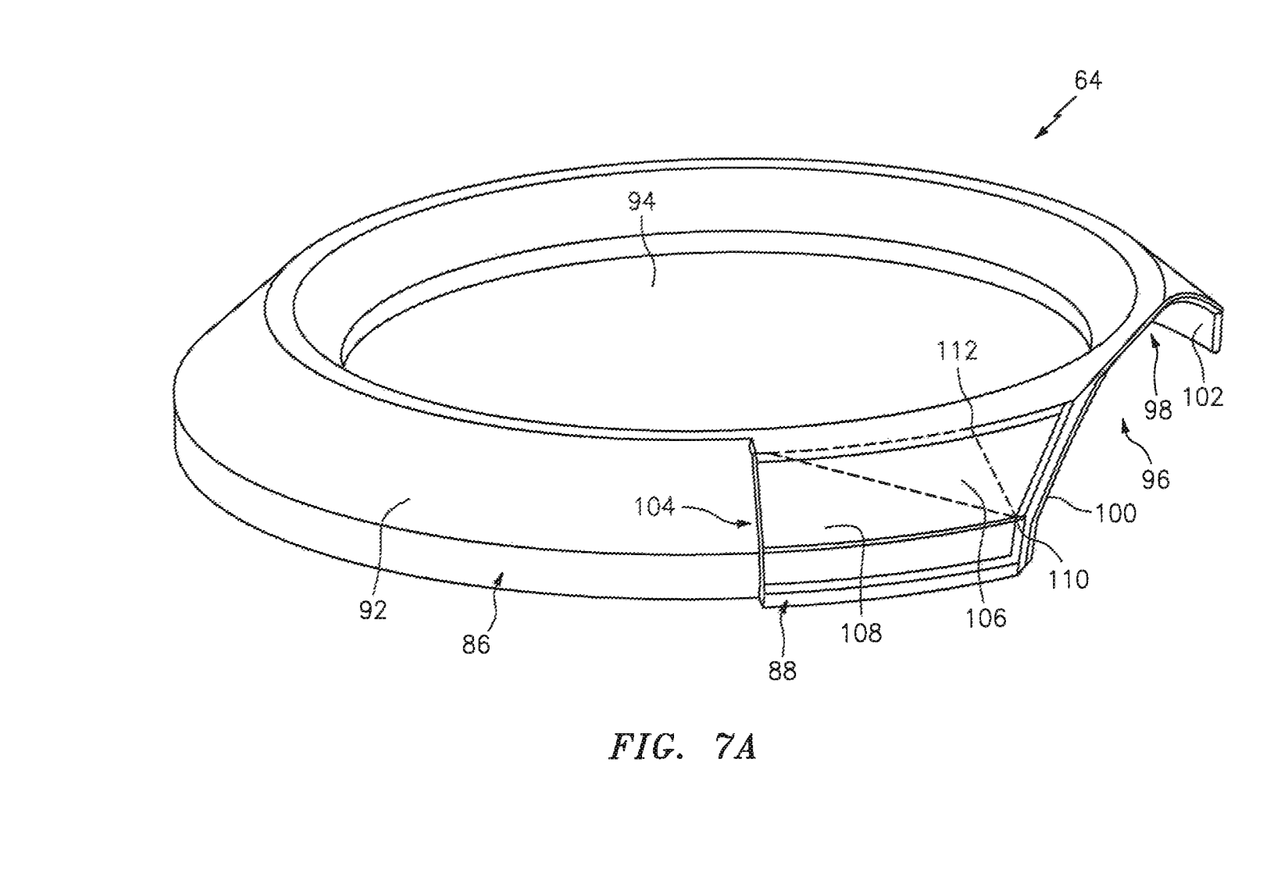
FIG. 7A is a perspective illustration of an exterior side of the baffle shown with a transparent wall for visualization purposes.

Referring to FIGS. 5 to 7, the peripheral portion 92 is further configured to form an arcuate baffle channel 98; e.g., a lubricant gutter. This baffle channel 98 extends circumferentially around the second rotational axis 72 between a first channel end 100 and a second channel end 102 (see FIG. 6), where the first channel end 100 may be located forward of the second channel end 102 when viewed relative to the rotation of the second gear 62. This channel 98 may have a generally u-shape cross-sectional geometry as shown in FIG. 5; however, the present disclosure is not limited to such an exemplary embodiment. The channel 98 is sized and the peripheral portion 92 of the baffle wall 86 is configured such that the second gear 62 extends axially and/or radially into the channel 98. More particularly, the second subset 84 of the second gear teeth 76 project into the channel 98 such that, for example, the peripheral portion 92 wraps partially around those gear teeth 76. The peripheral portion 92 of the baffle wall 86 thereby covers a radial outer peripheral region of the second gear 62. In the exemplary embodiment of FIG. 4, this peripheral region may extend between about 3.3 and about 5.3 radians around the second rotational axis 72 (e.g., approximately between the ends 100 and 102; see FIG. 6); however, the present disclosure is not limited to such an exemplary embodiment. In this manner, the peripheral portion 92 covers at least some or substantially all of the unmeshed/disengaged second gear teeth 76 and substantially prevents those second gear teeth 76 from receiving additional lubricant moving within the compartment 90.

Referring to FIG. 6, the interior portion 94 of the baffle wall 86 may be configured to substantially plug an inner bore formed by the peripheral portion 92. Of course, in some embodiments, the interior portion 94 may include one or more apertures such as through-holes (not shown).

Referring to FIG. 4, during operation, the second gear 62 may propel lubricant (used for lubricating the meshing between the gears 60 and 62) off of the second gear teeth 76 at a region approximately where those second gear teeth 76 disengage from the first gear teeth 70. To direct this used lubricant away from the second gear 62, the baffle outlet 88 is configured to form a lubricant outlet passage 104 through the baffle wall 86. Referring to FIGS. 5-7, this lubricant outlet passage 104 fluidly couples the channel 98 with a portion of the compartment 90 external of the baffle 64. The baffle outlet 88 is thereby configured to direct the used lubricant out of the channel 98 and away from the baffle 64 through the lubricant outlet passage 104.

The baffle outlet 88 may be located generally at (e.g., on, adjacent or proximate) the first channel end 100. The baffle outlet 88, for example, may be located within 3 radians of the first subset 80 of the second gear teeth 76. In this manner, the baffle outlet 88 may direct the majority of the used lubricant away from the second gear teeth 76 while also reducing the area that the used lubricant can churn within the channel 98 before being removed. This in turn may reduce windage on the second gear teeth 76 and, thereby, further increase transmission system 54 efficiency. Note, if the baffle 64 was configured without the baffle outlet 88, the used lubricant would be generally trapped within the channel 98 and would increase windage on the second gear teeth 76.

Figure 7B:
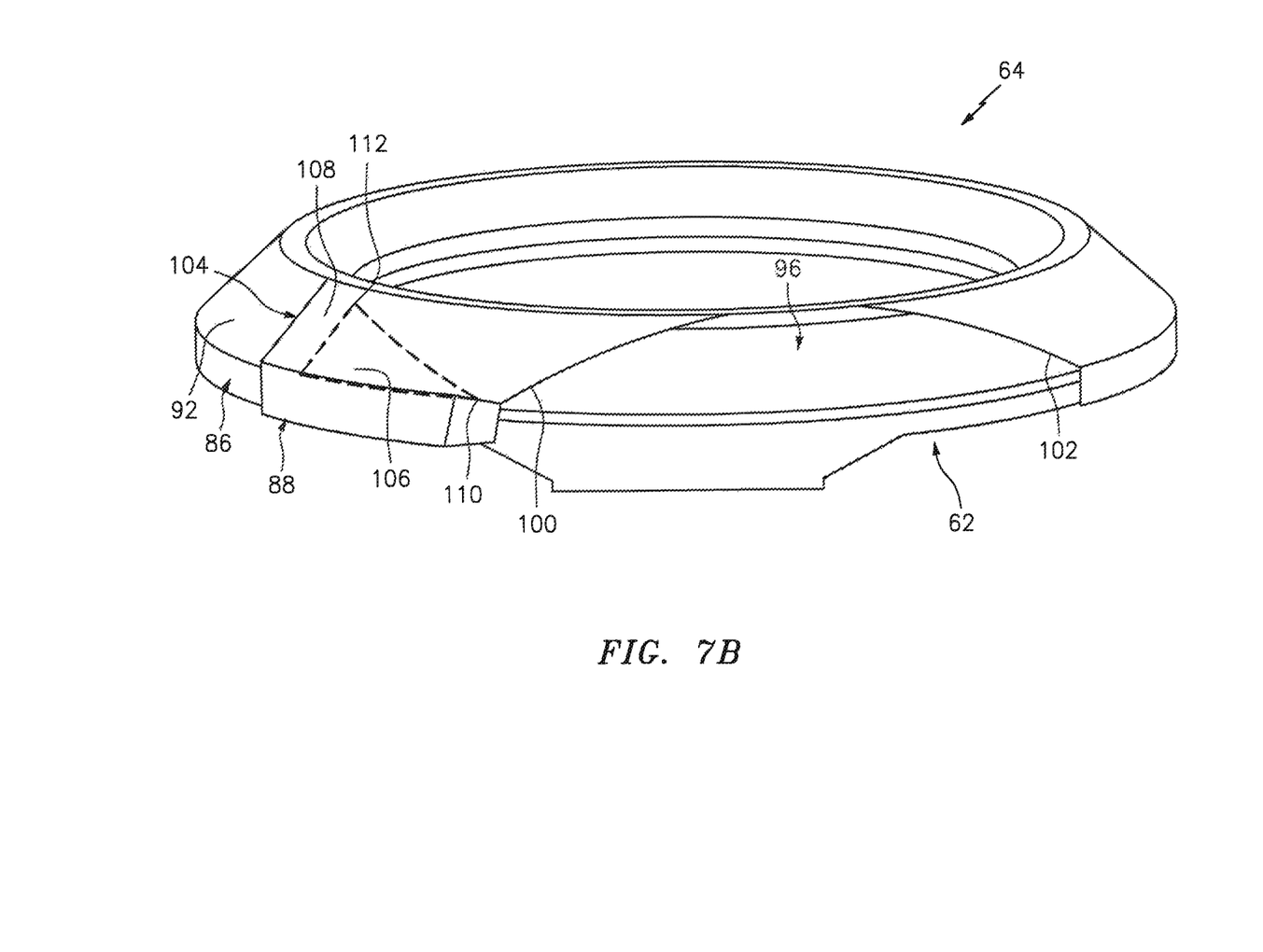
FIG. 7B is a perspective illustration of an exterior side of an alternative baffle shown with a transparent wall for visualization purposes, which baffle is configured with a bevel gear.

Referring to FIGS. 5-7, the baffle outlet 88 may be configured as a double wall portion of the baffle 64. The baffle outlet 88 of FIGS. 5-7, for example, includes an orifice 106 and an orifice cover 108. The orifice 106 extends through the baffle wall 86 (e.g., the peripheral portion 92). The orifice 106 forms a first (upstream) portion of the lubricant outlet passage 104. The orifice 106 of FIGS. 5-7 has a polygonal (e.g., triangular) cross-sectional geometry. This orifice 106 has a first circumferential width at a first location 110 and a second circumferential width at a second location 112, where the first location 110 is radially closer to second rotational axis 72 than the second location 112. The first circumferential width may be greater than the second circumferential width. Alternatively, referring to FIG. 7B, the first circumferential width may be less than the second circumferential width; note, such an alternative orifice 106 configuration is applicable to each of the baffle 64 embodiments disclosed herein. The present disclosure, however, is not limited to the foregoing exemplary orifice configuration. Furthermore, in some embodiments, the orifice 106 may be formed by an array of apertures; e.g., a porous portion of the baffle wall 86.

Referring again to FIGS. 5-7, the orifice cover 108 is configured to at least (e.g., circumferentially and/or radially) overlap the orifice 106. In the embodiment of FIGS. 5-7, the orifice cover 108 further projects circumferentially beyond the orifice 106 thereby overlapping the baffle wall 86. The orifice cover 108 is connected to the baffle wall 86. For example, the orifice cover 108 may be formed integral with or otherwise attached to the baffle wall 86 at opposing sides of the orifice 106 as well as at an upstream end of the orifice 106 as best seen in FIG. 7. In this manner, the orifice cover 108 forms a second (downstream) portion of the lubricant outlet passage 104 with the baffle wall 86 and, more particularly, the peripheral portion 92. With this configuration, the lubricant outlet passage 104 is operable to direct used lubricant away from the second gear 62 as well as reduce the likelihood of other lubricant surrounding the baffle 64 from flowing in an opposite direction through the lubricant outlet passage 104 and impinging on the second gear teeth 76.

Figure 8:
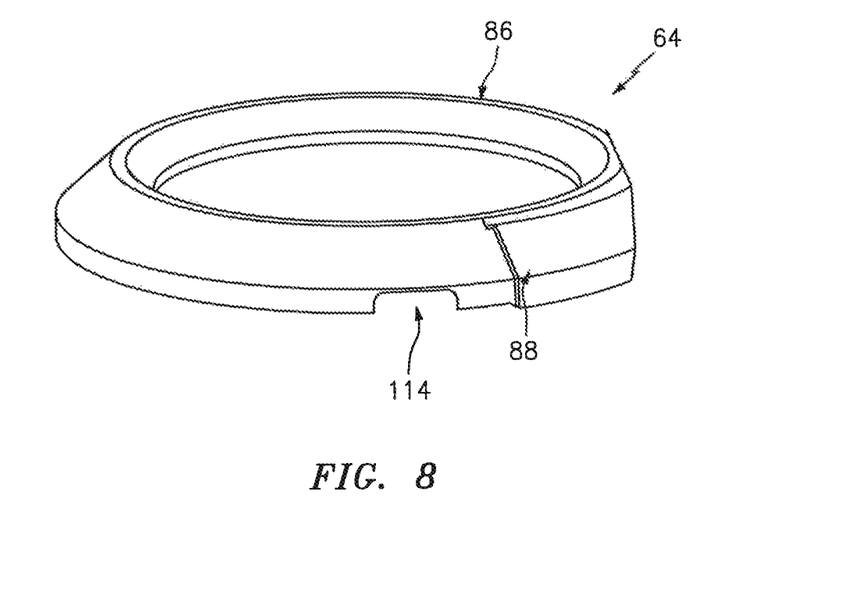
FIG. 8 is a perspective illustration of an exterior side of an alternative baffle.

In some embodiments, as illustrated in FIG. 8, the baffle 64 may also (or alternatively) include a second baffle outlet 114. This baffle outlet 114 may be configured as a notch or aperture in the baffle wall 86 without a covering thereover. Alternatively, the second baffle outlet 114 may be configured similar to the baffle outlet 88 described above, but positioned at another circumferential location along the baffle wall 86.

Figure 9:
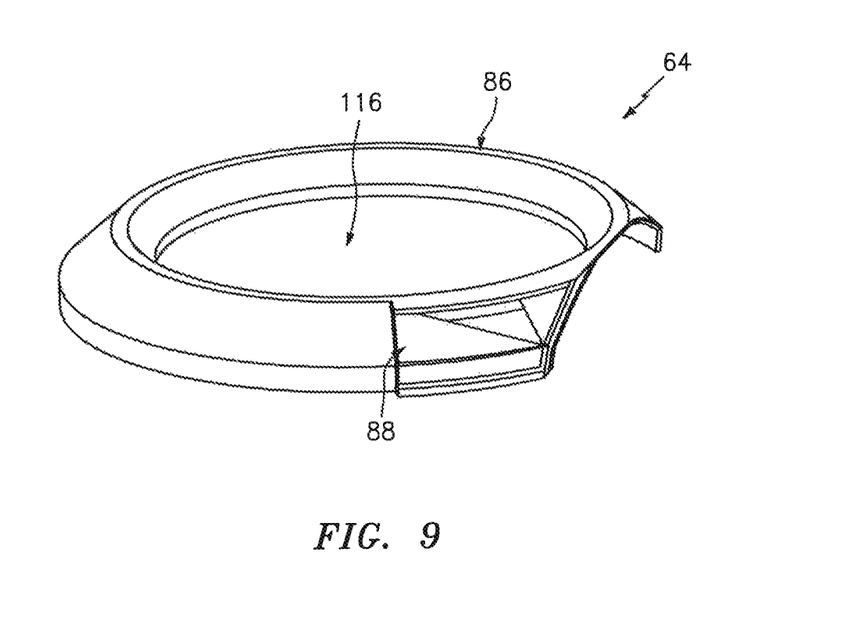
FIG. 9 is a perspective illustration of an exterior side of another alternative baffle shown with a transparent wall for visualization purposes.

In some embodiments, as illustrated in FIG. 9, the baffle wall 86 may be configured as a segmented annular body. The baffle wall 86, for example, may be configured without some or all of the interior portion 94 (see FIG. 4); e.g., with an inner bore 116.

In some embodiments, the baffle 64 may be configured with the first gear 60 rather than the second gear 62. In other embodiments, an additional baffle may be included. This additional baffle may be configured similar to the baffle 64 described above and may be configured with the first gear 60 such that both gears 60 and 62 are configured with its own baffle.

The transmission system 54 (see FIGS. 1 and 2) may be included in various turbine engines other than the one described above as well as in other types of rotational equipment; e.g., any system which utilizes lubricated bevel gears, for example. The transmission system 54, for example, may be included in a geared turbine engine where a gear train connects one or more shafts to one or more rotors in a fan section, a compressor section and/or any other engine section. Alternatively, the transmission system 54 may be included in a turbine engine configured without a gear train. The transmission system 54 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:
1. A transmission system, comprising:
a first bevel gear;

a second bevel gear meshed with the first bevel gear, and including a plurality of gear teeth arranged in a circumferential array; and a baffle including a baffle wall and a baffle outlet, the baffle wall arranged next to and covering a subset of the gear teeth, and the baffle outlet forming a lubricant outlet passage that extends through the baffle wall;

wherein the baffle outlet includes an orifice and an orifice cover;

wherein the orifice extends through the baffle wall and forms a first portion of the lubricant outlet passage; and wherein the orifice cover overlaps the orifice, is connected to the baffle wall, and forms a second portion of the lubricant outlet passage with the baffle wall.

2. The transmission system of claim 1, wherein the subset of the gear teeth are disengaged from the first bevel gear, and another subset of the gear teeth are meshed with the first bevel gear.

3. The transmission system of claim 2, wherein the baffle outlet is located proximate the other subset of the gear teeth.

4. The transmission system of claim 1, wherein the subset of the gear teeth define a radial outer peripheral region of the second bevel gear which extends circumferentially around a rotational axis of the second bevel gear more than about 4.7 radians.

5. The transmission system of claim 1, wherein the subset of the gear teeth define a radial outer peripheral region of the second bevel gear which extends circumferentially around a rotational axis of the second bevel gear between about 3.3 radians and about 5.3 radians.

6. The transmission system of claim 1, wherein the baffle wall is configured to substantially prevent the subset of the gear teeth from receiving lubricant.

7. The transmission system of claim 1, wherein the baffle wall forms a baffle channel, and the subset of the gear teeth extend into the baffle channel.

8. The transmission system of claim 7, wherein
the baffle channel extends circumferentially around a rotational axis of the second bevel gear between a first channel end and a second channel end;
the first channel end is disposed forward of the second channel end relative to rotation of the second bevel gear about the rotational axis; and
the baffle outlet is arranged at the first channel end.

9. The transmission system of claim 1, wherein the orifice cover projects circumferentially beyond the orifice.

10. The transmission system of claim 1, wherein the orifice has a polygonal cross-sectional geometry.

11. The transmission system of claim 1, wherein the orifice has a first circumferential width at a first location and a second circumferential width at a second location, the first circumferential width is less than the second circumferential width, and the first location is radially closer to a rotational axis of the second bevel gear than the second location.

12. The transmission system of claim 1, wherein the baffle outlet is formed by a double walled portion of the baffle.

13. The transmission system of claim 1, wherein the baffle further includes a window, a portion of the second bevel gear extends radially out through the window, and the portion of the second bevel gear meshes with the first bevel gear.

14. The transmission system of claim 1, wherein the baffle further includes a second baffle outlet which forms a second lubricant outlet passage that extends through the baffle wall.

15. The transmission system of claim 1, further comprising a turbine engine spool and a tower shaft, wherein the first bevel gear is connected to the turbine engine spool, and the second bevel gear is connected to the tower shaft.

16. A transmission system within a compartment, comprising:
a first bevel gear;
a second bevel gear including a plurality of gear teeth arranged in a circumferential array, wherein a first subset of the gear teeth within a first region are meshed with the first bevel gear, and wherein a second subset of the gear teeth within a second region are disengaged from the first bevel gear; and
a baffle including a baffle wall and a baffle outlet, the baffle wall configured to substantially prevent the second subset of the gear teeth in the second region from receiving lubricant particles moving within the compartment, and the baffle outlet forming a lubricant outlet passage that extends through the baffle wall, wherein the lubricant outlet passage is configured to receive lubricant propelled off of the second bevel gear;
wherein the baffle outlet includes an orifice and an orifice cover;
wherein the orifice extends through the baffle wall and forms a first portion of the lubricant outlet passage; and
wherein the orifice cover overlaps the orifice, is connected to the baffle wall, and forms a second portion of the lubricant outlet passage with the baffle wall.

17. The transmission system of claim 16, wherein the baffle wall covers the second subset of the gear teeth in the second region.

18. A transmission system, comprising:
a first bevel gear;
a second bevel gear meshed with the first bevel gear, and including a plurality of gear teeth arranged in a circumferential array; and
a baffle including a baffle wall and a baffle outlet, the baffle wall arranged next to and covering a subset of the gear teeth, and the baffle outlet forming a lubricant outlet passage that extends through the baffle wall;
wherein an interior portion of the baffle wall is configured to substantially plug an inner bore formed by a peripheral portion of the baffle wall;
wherein the baffle outlet includes an orifice and an orifice cover;
wherein the orifice extends through the baffle wall;
wherein the orifice cover overlaps the orifice and is connected to the baffle wall; and
wherein the lubricant outlet passage comprises the orifice and a space extending between the orifice cover and the baffle wall.

* * * * *